United States Patent
Wright et al.

[15] 3,689,560
[45] Sept. 5, 1972

[54] CERTAIN DIFLUORAMINO COMPOUNDS

[72] Inventors: Charles D. Wright, White Bear Lake; Joseph La Mar Zollinger, Woodbury Township, Washington County, both of Minn.

[73] Assignee: Minnesota Mining and Manufacturing Company, St. Paul, Minn.

[22] Filed: Nov. 15, 1962

[21] Appl. No.: 239,101

[52] U.S. Cl. ..................260/583 NH, 149/109
[51] Int. Cl. ..................C07c 87/20, C07c 87/22
[58] Field of Search ..................26/583, 583 NH

[56] References Cited

OTHER PUBLICATIONS

Hoffman et al., Chem. Reviews, Vol. 62, pp. 12–18 (1962)

*Primary Examiner*—Leland A. Sebastian
*Attorney*—Frank A. Steldt and Donald C. Gipple

EXEMPLARY CLAIM

1. Fluorinated compounds of the group consisting of compounds having the formula

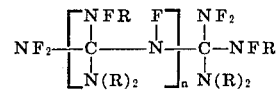

wherein $n$ is a number of the group 0 and 1 and R IS AN ATOM OF THE GROUP HYDROGEN AND FLUORINE, ALL R's being identical in any one compound.

6 Claims, No Drawings

CERTAIN DIFLUORAMINO COMPOUNDS

This invention relates to fluorinated oxidants and more particularly to certain new poly(difluoraminomethyl)-substituted oxidant compounds.

Fluorinated organic compounds containing several difluoramino groups are known, and some of these are powerful oxidants useful in propellant and explosive compositions. So far as is known, however, compounds containing carbon in which all four valences are substituted by fluorinated nitrogen groups, have not been heretofore known.

It is an object of this invention to produce fluorinated oxidants containing only carbon, nitrogen and fluorine, and in which the carbon atoms are attached only to nitrogen.

A further object of the invention is to provide a process for producing the said fluorinated oxidant compounds.

Other objects of the invention will be apparent from the disclosures hereinafter made.

The compounds of the invention include tetrakis (difluoramino)methane, having the structural formula

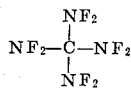

and di tris(difluoramino)methyl fluoramine, having the structural formula

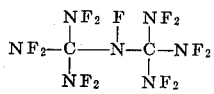

The compounds of the invention are strongly oxidizing materials which are characterized by having relatively low vapor pressures at ordinary temperatures. Thus, they can be employed as storable oxidants for propellant systems. They are powerful oxidizing compounds because they contain the maximum possible number of fluorinated amino groups attached to carbon.

The compounds of the invention are produced by fluorination of novel intermediate adducts represented by the following formula:

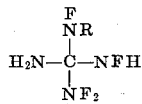

wherein R is a member of the group consisting of fluorine and the radical

The intermediate adducts are readily produced by the action of ammonia or its equivalent on perfluoroguanidine, represented by the formula:

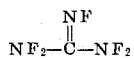

or on perfluorobiguanide having the formula:

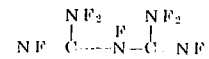

The reaction may be illustrated by the following equation:

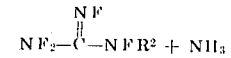

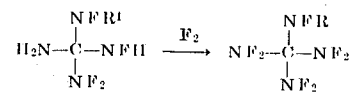

in which R represents a member of the group consisting of fluorine and the tris(difluoramino)methyl radical, i.e., the radical of the formula:

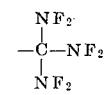

$R^1$ has the significance set forth hereinabove and $R^2$ is a member of the group consisting of fluorine and the radical

Because the compounds of the invention contain only fluoramino groups and carbon, they are characterized by having an infrared absorption spectrum containing a continuous strong absorption band with several peaks between 10 and 11 microns, corresponding to the NF bonds, and a less strong peak at about 8.9 microns corresponding to the CN bonds. The compounds have extremely strong oxidizing power and are shock sensitive.

The intermediate adducts are likewise shock sensitive materials, which are stable at temperatures of the order of about 0° C. They are viscous oils of low vapor pressure which decompose before they boil. Preferred intermediates are those which are produced by the reaction of ammonia with perfluoroguanidine and perfluorobiguanide.

The fluorinated compounds from which the intermediate adducts are prepared are produced by direct fluorination of ammeline, to produce perfluoroguanidine, and biguanide, to produce perfluorobiguanide. These methods are described more fully in the copending application for U.S. Letters Pat. of Koshar and Husted, Ser. No. 99,632 filed Mar. 30, 1961 now U. S. Pat. No. 3,461,162.

In preparing the adducts, the reaction of the ammonia with the fluorinated compound is carried out at low temperatures of the order of about −40° to −20° C. in a solvent such as acetonitrile. The adduct is then isolated by evaporating the solvent and any low-boiling concomitants at low temperatures, of the order of about −20° to 0° C. The purified adduct is then fluorinated, by treating directly with fluorine at temperatures in the range of about −50° to +50° C., preferably not above +25° C. A mixture of products is obtained from which the desired end product of the invention is recovered, as by gas-liquid chromatography.

Because of their extremely strong oxidizing power and their shock sensitivity, it is necessary that the compounds of the invention and the intermediate compounds as well as the starting materials be handled with caution. Manipulation of the compounds as well as the conduct of the reactions call for extreme care and precautions to prevent injury in the event of explosion.

The fluorinated oxidant derivatives of the invention are useful in explosive and propellant compositions. They can be ignited as by means of a squib or exploded with a cartridge. Propellant compositions containing the compounds of the invention, combined with fuel such as lithium or boron and optionally with an additional oxidizer such as ammonium perchlorate to consume any carbon present, such as that in any organic binder used, burn with intense heat and the formation of large volumes of gases.

The following examples will more specifically illustrate the process for the preparation of the compounds of the invention and their properties.

EXAMPLE 1

In a 10 ml. glass reactor equipped with a magnetic stirring bar and a 4 mm. Fisher Porter polytetrafluoroethylene needle valve is placed 4 ml. of dry acetonitrile which has been distilled from phosphorous pentoxide. Into this solvent is condensed anhydrous ammonia (0.014 g., 0.81 × 10⁻³ mole). The mixture is warmed, thoroughly mixed and cooled to −119° C. with a bromoethane slush bath. Perfluoroguanidine (0.15 g., 1.0 × 10⁻³ mole) is introduced by condensation at −119° C. The reactor is closed, stirring is begun and the reactor is allowed to warm slowly in an empty but cold glass dewar flask until the acetonitrile melts. The mixture is stirred for 1 hour at −20° C. All volatile components are removed from the reactor by reducing the pressure to less than 0.1 mm. for one-half hour at 0° C. The residue thereafter remaining in the flask consists of small amounts of a white solid and of a yellow viscous oil. This oil is dissolved in about 0.2 g. of dry acetonitrile and a fluorine nuclear magnetic resonance spectrum is obtained. The oil is identified as the adduct $H_2NC(NF_2)CNFH$ by absorptions at −20.5 $\phi$ (—$NF_2$ groups) and at +135.1 $\phi$ (double fivefold, —NFH group). The J values for the peak at +135.1$\phi$ are 50.5 C/S for the doublet and 9.8 C/S for the fivefold splitting.

A small amount of trifluoroguanidine, $H_2NC(NF_2)$NF is obtained as a by-product as determined by fluorine nuclear magnetic resonance absorptions at −46 $\phi$ (—$NF_2$ group) and at +52 $\phi$ (  NF group).

The adduct $H_2NC(NF_2)_2NFH$ is stored in a closed vessel at −78° C. until it is reacted further.

EXAMPLE 2

The compound $H_2NC(NF_2)_2NFH$ (0.080 g.) prepared as described in Example 1, is fluorinated with 6.1 percent fluorine diluted with dry nitrogen in the absence of a solvent in a glass reactor at 0° C. for about 2.5 hours. A total of 0.07 moles of fluorine is passed through the reactor. The product gases are swept through sodium fluoride pellets at 25° C. in order to remove hydrogen fluoride and are collected in a dry glass trap which is cooled with liquid oxygen. The trap contains a mixture of compounds which include $FC(NF_2)_3$ and $C(NF_2)_4$. These components are separated by gas-liquid chromatography on a column consisting of 33 percent Kel–F (polychlorotrifluoroethylene) tetramer on Celite (diatomaceous earth) at 25° C. The relative retention times, $T_R$, relative to $CFCl_3$, are: $CF(NF_2)_3$, 36.2; and $C(NF_2)_4$, 148. (Relative retention time is defined as follows:)

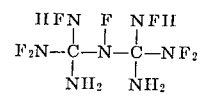

These components are collected from the chromatography column in dry traps which are cooled with liquid nitrogen.

Tetrakis(difluoramino)methane is a liquid with a boiling point of about 35° C. The liquid explodes when hit a sharp blow from a hammer, but is unchanged when stored in the gas phase with water. The infrared spectrum of the tetrakis(difluoramino) methane contains a continuous strong absorption at 10–11 microns with three peaks at about 10.15, 10.45 and 10.9 microns which are due to N—F groups and a weak absorption at about 8.9 microns which is due to the C—N group. A nuclear magnetic resonance spectrum containing a single peak at about −30 $\phi$ is consistent with the structure of $C(NF_2)_4$.

EXAMPLE 3

Perfluorobiguanide is treated with ammonia, the resulting adduct is isolated as a viscous oil of the structure

```
      HFN   F   NFH
       |    |   |
F₂N—C—N—C—NF₂
       |        |
      NH₂     NH₂
``` and fluorinated as above.

The products of fluorination are subjected to gas-liquid chromatography, the fraction of the major components thus fluorinated having the longest retention time being di-[tris(difluoroamino)methyl]-fluoramine. The liquid thus obtained is shock sensitive and strongly oxidizing. Characteristic absorption peaks in its infrared spectrum are several peaks in a strong continuous absorption band at 10–11 microns indicating N—F bonds and a weaker peak at about 8.9 microns owing to the C—N bond.

What is claimed is:

1. Fluorinated compounds of the group consisting of compounds having the formula

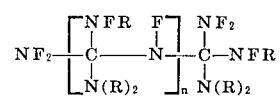

wherein $n$ is a number of the group 0 and 1 and R is an atom of the group hydrogen and fluorine, all R's being identical in any one compound.

2. Tetrakis(difluoramino)methane represented by the formula:

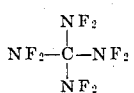

3. Di[tris(difluoramino)methyl]fluoramine represented by the formula:

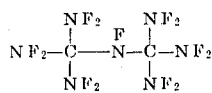

4. A compound having the formula:

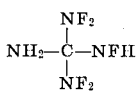

5. A compound represented by the formula:

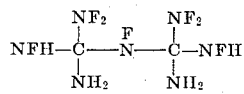

6. A process for the preparation of a compound of the formula:

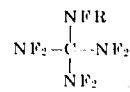

wherein R is a member of the group consisting of fluorine and the tris(difluoramino)methyl radical, which comprises directly fluorinating a compound of the formula:

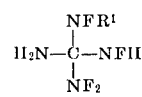

wherein $R^1$ is a member of the group consisting of fluorine and the radical having the formula:

under substantially anhydrous conditions at a temperature in the range of about $-50°$ to $+50°$ C.

* * * * *

UNITED STATES PATENT OFFICE
CERTIFICATE OF CORRECTION

Patent No. 3,689,560         Dated September 5, 1972

Inventor(s) Charles D. Wright and Joseph La Mar Zollinger

It is certified that error appears in the above-identified patent and that said Letters Patent are hereby corrected as shown below:

Column 2, line 4, "NF C-N-C NF" should read --NF=C-N-C=NF-- .

Column 3, line 51, "$H_2NC(NF_2)CNFH$" should read --$H_2NC(NF_2)_2NFH$-- .

Column 3, line 56, "$H_2NC(NF_2)$" should read --$H_2NC(NF_2)=$-- .

Column 3, line 59, "( NF group)" should read --(=NF group)-- .

Signed and sealed this 3rd day of April 1973.

(SEAL)
Attest:

EDWARD M. FLETCHER, JR.          ROBERT GOTTSCHALK
Attesting Officer                Commissioner of Patents